Nov. 8, 1938.  W. FORSTNER  2,135,616
CONNECTER FOR ADJUSTABLE APPAREL BELT CHAIN ENDS
Original Filed Oct. 15, 1934
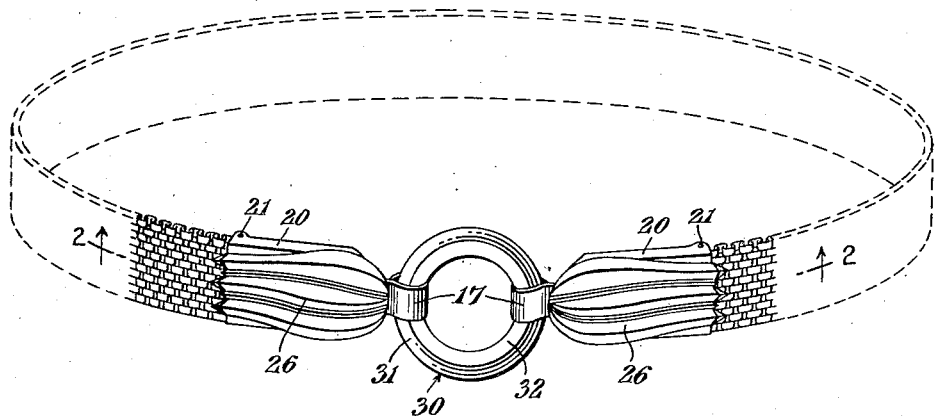
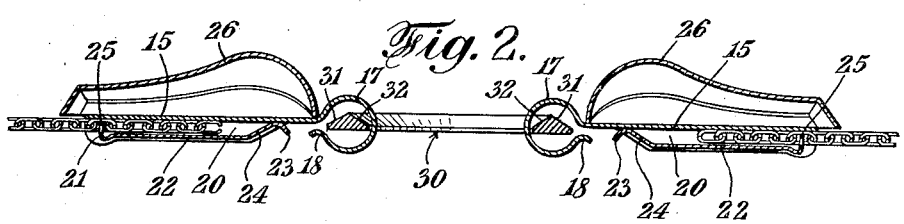
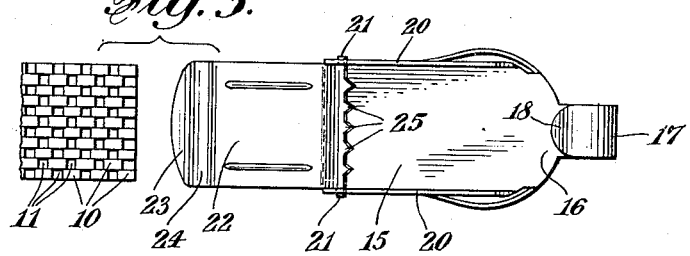
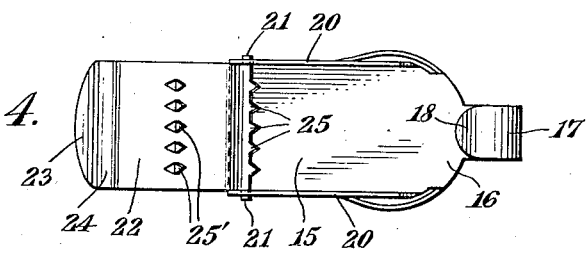
INVENTOR
Walter Forstner.
BY
Warren E. Willis.
his ATTORNEY Patented Nov. 8, 1938

2,135,616

UNITED STATES PATENT OFFICE 2,135,616

CONNECTER FOR ADJUSTABLE APPAREL BELT CHAIN ENDS

Walter Forstner, Irvington, N. J.

Application October 15, 1934, Serial No. 748,301
Renewed May 28, 1936

1 Claim. (Cl. 24—265)

This invention relates to devices for connecting the ends of ornamental chain belts, as used on dresses, and like wearing apparel, and more particularly to connecters capable of adjusting the length of the belt and concealing its ends.

Belts formed of woven or braided wire, stamped links, etc., either wholly or in part of metal, whether precious, semi-precious, plated or enamelled in colors, are extremely popular because of their novelty, lightness, strength, flexibility and pleasing appearance.

Such chains are manufactured by automatic machines in indefinitely great lengths, afterwards to be cut into lengths approximately suitable for belts, but obviously, due to different waist measurements, individual length adjustment is essential in obtaining a satisfactory result in fitting.

It is therefore an object of this invention to provide a connecter having catches adjustably engageable on each end portion of the belt and having hook elements to snap over the thickened side faces of a connecter ring, thereby to be normally retained in operative position until forcibly removed.

A further feature is in the provision of a catch having a pivoted member provided with spaced teeth on its raised angular portion, the serrations being suited in size, shape and number to enter the interstices between adjacent links of the chain in a manner to become locked thereto, and releasable only upon raising the member from its normal closed and frictionally restrained position.

Another purpose is to produce a belt fastener consisting of only two parts, ornamentally designed in conformity with the appearance of the belt, easy of application and adjustment, and inexpensive to construct.

These several advantageous objects are accomplished by the novel design, construction and combination of parts hereinafter described and illustrated in the accompanying drawing, constituting a material component of this disclosure, and in which:—

Figure 1 is a perspective view of an apparel belt of chain type provided with a connecter made in accordance with the invention.

Figure 2 is a fragmentary longitudinal section view, drawn to an enlarged scale and taken on line 2—2 of Figure 1.

Figure 3 is a bottom plan view of one of the connecter catches, shown in open position and indicating the end of a chain engageable therewith.

Figure 4 is a similar view of a connecter catch showing an additional row of chain engaging teeth.

The type of chain composing the belt is of the metallic mesh variety, so constructed as to present smooth surfaces on both sides and edges; it consists of a series of links 10 offset alternately with spaces 11 arranged uniformly throughout the length of the chain, which is highly flexible laterally and limitedly flexible in the direction of its width.

The connecter elements consist of two duplicate catches and a ring engageable therebetween. Each catch consists of an elongated rectangular plate 15, one end of which is straight across and the other curved outwardly, as at 16, terminating in a narrow extension bent to produce a circular loop 17 having its reentrantly turned, rounded end 18 bent slightly outward and definitely distanced from the plate, these elements constituting a resilient hook.

Formed on the longitudinal edges on one side of the plate 15 are raised parallel flanges 20 extending at right angles from the squared end to the opposite curved portion, and in these flanges, near the squared end, are openings adapted to receive pintles 21 formed on the edges of a flap 22 and acting as pivots by which the flap may be turned relatively to the plate 15.

The longitudinal edges of the flap 22 are suited to neatly engage between the flanges 22 being frictionally held by them when pressed towards the plate 15, raising being facilitated by a finger grip 23, formed on the free end of the flap, which is bent as at 24, to contact the plate 15 when the flap is closed, thereby covering and concealing the end of the belt entered in the space between the walls 15 and 22.

The opposite, pivoted ends of the flap is bent at a right angle and provided with sharply defined teeth 25, in number and distance apart to agree with the spaces 11 of the chain into which they interlockingly engage.

Reinforcing ribs as shown may be used for stiffening the flap, and, as shown in Figure 4, an auxiliary series of teeth 25' may be formed integrally on the under side of the flap thus providing a double grip on the chain.

On the outer side of the casing plate 15 is preferably attached any approved ornament 26 extending from the base of the hook 17 rearwardly to cover the teeth of the flap and entering portion of the chain, giving a fanciful appearance to the structure.

These catches are connected by a ring generally designated by the numeral 30, one side of which may be flat and the other bevelled, as at 31, from its outer edge to the center of its width, meeting an opposite bevel 32 from its inner edge.

These bevelled surfaces meet at the apex centrally in the width of the ring, constituting a triangular pyramidal cross section, the apex or central portion of which is materially thicker than the opening of the hooks 17, thus preventing casual separation, but due to the bevelled surfaces is easy to attach and detach upon the application of moderate force.

In operation the flap is raised at approximately a right angle from the body of the casing, an end of the belt inserted below the flap to such distance as may be required in adjusting its length to an individual, and the flap pressed parallel with the plate 15 to engage between the flanges; when both catches have been fixed on the belt ends, so that their teeth are locked in the belt, the ring is applied in an obvious manner.

Although the foregoing is descriptive of the preferred embodiment of the invention, it will be apparent that minor changes may be made in its construction, without the exercise of invention or conflicting with the scope of the claim hereto appended.

I claim:—

A belt connecter comprising a sheet metal member having a generally rectangular flat base forming a front and generally rectangular sides at right angles to said base and extending rearwardly, a generally rectangular lock plate pivoted at one end between said sides near the upper edges of said sides away from said base, said sides being flexible to grip the edges of said lock plate in closed position, said lock plate having a bent cam portion at the pivot end engageable with a belt end, and having a bent up portion at the other end extending towards the base and then reversing to form a finger grip, said cam portion and said bent up portion being of a height to keep said locking plate in spaced parallel relation to said base when said finger grip is in contact with said base, whereby said lock plate when positioned between said sides forms a rectangular casing with said member, said member having a hook at the end opposite the lock plate pivot.

WALTER FORSTNER.